Figure 1:
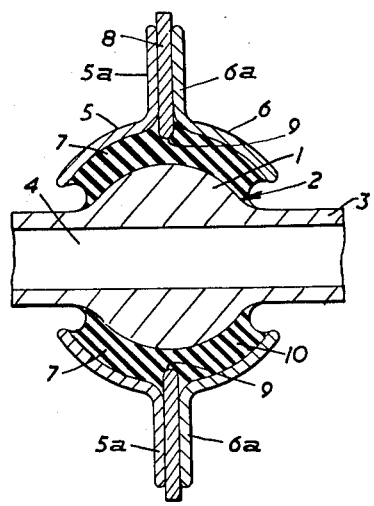

April 17, 1962  J. B. S. COMPTON  3,030,132

PIVOTAL JOINTS FOR UNIVERSAL MOVEMENT

Filed July 8, 1960

INVENTOR
JACK B. S. COMPTON

BY

ATTORNEYS

3,030,132
PIVOTAL JOINTS FOR UNIVERSAL MOVEMENT
Jack Bernard Spencer Compton, Crawley, England, assignor to Silentbloc Limited, Crawley, England, a company of Great Britain
Filed July 8, 1960, Ser. No. 41,625
Claims priority, application Great Britain July 20, 1959
1 Claim. (Cl. 287—85)

This invention relates to pivotal joints having limited universal movement and of the kind comprising an inner member having an annular surface of substantially part-spherical form and with its largest diameter at a point intermediate in its axial length, an annular outer member having an annular part-spherical inner surface surrounding, approximately concentric with and spaced from the annular part-spherical surface of the inner member, and a layer of rubber or like flexible resilient material interposed between the inner and outer members and adhering to them so that a degree of universal pivotal movement can take place between the inner and outer members by reason of inter-molecular deformation of the rubber.

It is an object of the invention to provide an improved pivotal joint of the above kind which will lend itself to ready manufacture, while being reliable and satisfactory in use, and which will permit of a satisfactory degree of universal movement between the inner and outer members without necessarily involving corresponding freedom of relative movement under radial loads.

To this end a pivotal joint having limited universal movement according to the present invention comprises an inner member (hereinafter for convenience called the ball) having an annular convex surface of substantially part-spherical form with its largest diameter at a point intermediate in its axial length, an outer member comprising two parts substantially concentric with the inner member and having annular part-spherical concave inner surfaces which surround, are approximately concentric with, and are spaced from, parts of the annular part-spherical surface of the inner member which lie respectively adjacent to the ends of that inner member, and a layer of rubber or like flexible resilient material in the annular space between the inner and outer members, the rubber or like flexible material being bonded to the part-spherical surfaces of the inner and outer members and being in a state of radial compression between such surfaces.

Generally the degree of radial compression of the rubber will diminish progressively from the ends of the space between the inner and outer members towards the centre of the length of such space.

According to another aspect of the invention a method of making a pivotal joint according to the invention includes the steps of assembling the two parts which are to constitute the outer member approximately concentrically about the ball but with their adjacent ends spaced from one another, substantially filling the space between the opposed part-spherical surfaces of the ball and such two parts with the rubber or like resilient material, as by injecting such material while in a plastic state, bonding the rubber or like resilient material to said surfaces, as by heat treatment, and moving the two parts of the outer member towards, and preferably into engagement with, one another, and securing them in position to compress the rubber and maintain it so compressed.

Further, in carrying out the method according to the invention referred to above there is preferably provided in the rubber before its compression by movement of the two parts of the outer member towards one another, an annular groove extending radially inwards into the rubber from the space between the adjacent ends of the two parts of the outer member, this groove preferably not extending completely to the surface of the ball. The groove in question is preferably closed up when the two parts of the outer member are moved towards or into engagement with one another but may be only partially closed.

In one convenient construction according to the invention the adjacent ends of the two parts constituting the outer member are provided with outwardly radially extending flanges, in which case the means for securing the two parts in position after moving them towards, and preferably into engagement with, one another may comprise bolts, rivets or the like passing through said flanges, or other means such as spot welding to hold the flanges together face to face.

In an alternative arrangement the two parts constituting the outer member may have substantially cylindrical outer surfaces preferably of the same diameter, and these two parts may be assembled and secured within a cylindrical bore in a housing as by making them a force fit within the housing and/or inserting them into position in the housing and retaining them in position by flanges formed on the ends of the housing.

Figure 2:
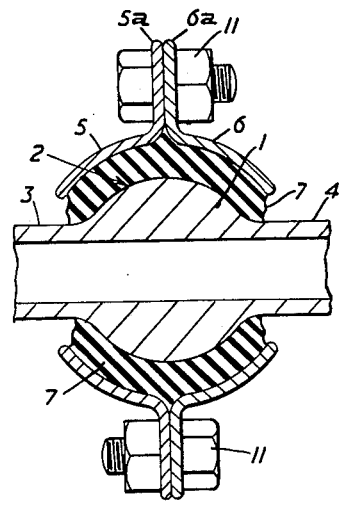
Figure 3:
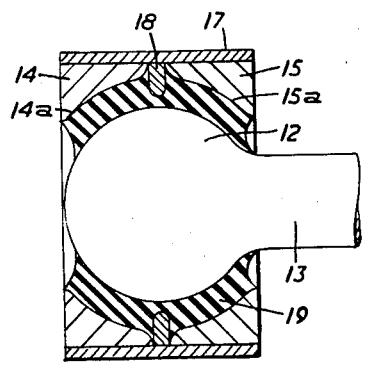
Figure 4:
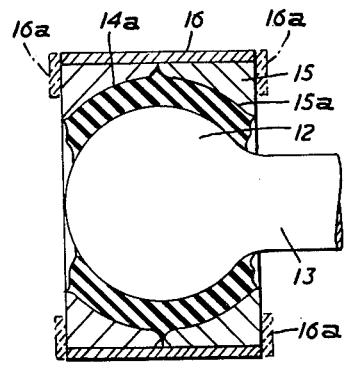

Two ways in which the invention may be carried into practice are illustrated by way of example in the accompanying drawings, in which:

FIGURE 1 is a cross-section in a plane containing the centre of curvature of the part-spherical surface of the ball member and the axis of the annular convex surface of the outer member of one form of the invention before the final stage in its assembly, FIGURE 2 is a similar view to FIGURE 1 of the form of joint shown in FIGURE 1 but after the final stage of assembly has been completed, FIGURE 3 is a similar view to FIGURE 1 at an intermediate stage of the manufacture of an alternative form of joint according to the invention, and FIGURE 4 is a similar view to FIGURE 3 showing the form of joint to which FIGURE 3 relates in its finally assembled form.

In the construction of joint shown in FIGURES 1 and 2 the joint comprises an inner ball member 1 having an annular part-spherical surface 2 sub-tending an angle at the centre of curvature of the surface of between 90° and 120° and having coaxial cylindrical rod-like projections 3 extending from opposite ends of the part-spherical surface 2. A bore 4 coaxial with the rod-like projections 3 extends completely through the ball member as shown.

The outer member is in the form of two similar annular part-spherical cups 5 and 6 arranged coaxially with the inner member and as shown each surrounding one annular half of the annular spherical surface 2 of the ball member and spaced from such surface. Interposed between the part-spherical surfaces of the outer member and ball member is a layer of rubber or like flexible resilient material 7 which is bonded to the part-spherical surfaces of the outer member and the ball member, and in the finally assembled state as shown in FIGURE 2 is in a state of radial compression between such surfaces.

During manufacture the two part-spherical cups 5 and 6 and the ball member are assembled in the relative positions shown in FIGURE 1 with a two-part annular plate, as indicated at 8, lying between the flanges 5a, 6a of the part-spherical cups so as to space them apart and with its inner circumferential edge 9 adjacent to but not in contact with the part-spherical surface 2 of the ball member, the uncured rubber composition being disposed, as indicated at 10, between the surfaces of the part-spherical cups and the ball member. The rubber is then cured and the plate 8 removed by separation of its two parts from between the flanges 5a, 6a so that the parts of the joint are as indicated in FIGURE 1 but without the plate 8. The final step in the assembly of the joint is to draw the two flanges 5a and 6a towards and into contact with one another as by bolts 11 passing through the flanges 5a, 6a so that the finished joint ready for operation is as shown in FIGURE 2.

It will be understood that the final drawing and clamping of the flanges 5a, 6a together may either be effected as the final manufacturing step or, where more convenient, may be left until the joint is assembled with the parts with which it is to be used, in which event the clamping bolts or the equivalent may serve also to clamp the outer member constituted by the two part-spherical cups 5 and 6 to the appropriate one of the two members to be connected by the joint.

In the modified construction according to the invention illustrated in FIGURES 3 and 4 the joint comprises an inner member comprising a ball member 12 from which projects radially a pin 13 by which the ball member can be secured to an appropriate part in known manner, and an outer member which in the completely assembled joint as shown in FIGURE 4 comprises two cup-like parts 14, 15 having appropriately formed inner annular part-spherical surfaces 14a, 15a and cylindrical outer surfaces, these two parts in the finally assembled joint as shown in FIGURE 4 being rigidly secured within an outer tubular housing 16 with their inner ends in contact with one another. The two parts 14 and 15 may be secured in position by being a force fit within the housing 16, or alternatively may be inserted into this housing and then retained therein with their inner ends in contact by spinning over or similarly forming flanges on the ends of the housing 16 as indicated in dotted line at 16a.

In production of the joint shown in FIGURE 4 the parts are first assembled as shown in FIGURE 3 within a housing 17 and with a two-part annular ring 18 between the adjacent ends of the cup-like parts 14 and 15 and projecting towards but not into contact with the spherical surface of the ball member 12 and with the uncured rubber composition 19 disposed as shown. The rubber is then cured so as to be bonded to the surfaces of the cup-like parts and of the ball member, the housing 17 and the ring 18 are removed and the parts are then re-assembled within the housing 16 in the manner referred to above as shown in FIGURE 4.

It will be apparent that in a joint constructed as described with reference to FIGURES 1 and 2 or to FIGURES 3 and 4 the degree of radial compression of the rubber between the part-spherical surfaces of the ball member and the outer member will diminish progressively from the ends of the space between these members towards the centre of the length of such space, and in both the above arrangements the bonding and the radial compression of the rubber in the final product will tend to prevent relative slipping movement between the rubber and the inner and outer members, and also that the radial compression of the rubber will tend to provide a joint in which freedom of pivotal movement is combined with resistance to relative radial movement between the inner and outer members. Moreover the relationship between the degree of freedom for pivotal movement and the resistance to radial movement can be varied over a wide range by variations not only in the thickness of the rubber layer in relation to the radii of curvature of the spherical surfaces of the inner and outer members, but also by the degree to which the two parts constituting the outer member are initially separated and subsequently moved towards one another and hence the degree of compression applied to the rubber.

References herein to the inner and outer members having annular part-spherical surfaces are to be interpreted as including surfaces which are of substantially completely spherical form except for a segment subtending an angle of substantially less than 180° at the centre of curvature.

What I claim as my invention and desire to secure by Letters Patent is:

A pivotal joint having limited universal movement comprising an inner member having an annular surface of substantially part-spherical form, with its largest diameter at a point intermediate in its axial length, an outer member comprising two annular parts substantially concentric with said inner member and having annular part-spherical concave inner surfaces which surround, are approximately concentric with and are spaced from those parts of the annular part-spherical surface of the inner member which lie respectively adjacent to the ends of the inner member, and a layer of flexible resilient material disposed in the annular space between the inner and outer members, said flexible resilient material being bonded to the part-spherical surfaces of said inner and outer members and being in a state of radial compression between such surfaces and the degree of said radial compression of the flexible resilient material diminishing progressively from the ends of the space between the inner and outer members toward the center of the length of such space.

References Cited in the file of this patent
UNITED STATES PATENTS

| | | |
|---|---|---|
| 1,943,631 | Skillman | Jan. 16, 1934 |
| 2,305,880 | Leighton | Dec. 22, 1942 |
| 2,607,617 | Pringle | Aug. 19, 1952 |
| 2,855,232 | Kozak | Oct. 7, 1958 |
| 2,871,025 | Neher | Jan. 27, 1959 |
| 2,932,081 | Witte | Apr. 12, 1960 |

FOREIGN PATENTS

| | | |
|---|---|---|
| 830,850 | France | May 23, 1938 |